United States Patent
Rauworth et al.

(10) Patent No.: US 9,900,115 B2
(45) Date of Patent: Feb. 20, 2018

(54) SYSTEM AND METHOD OF VOICE ANNUNCIATION OF SIGNAL STRENGTH, QUALITY OF SERVICE, AND SENSOR STATUS FOR WIRELESS DEVICES

(71) Applicant: Honeywell International Inc., Morristown, NJ (US)

(72) Inventors: Timothy A. Rauworth, West Chicago, IL (US); Douglas L. Hoeferle, South Elgin, IL (US); Robert J. Selepa, Naperville, IL (US); Pardeep Verma, Carpentersville, IL (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 54 days.

(21) Appl. No.: 14/627,288

(22) Filed: Feb. 20, 2015

(65) Prior Publication Data

US 2016/0248525 A1 Aug. 25, 2016

(51) Int. Cl.
| | |
|---|---|
| H04B 17/00 | (2015.01) |
| H04B 17/23 | (2015.01) |
| G08B 29/04 | (2006.01) |
| G08B 29/06 | (2006.01) |
| H04B 17/318 | (2015.01) |

(52) U.S. Cl.
CPC ............ *H04B 17/23* (2015.01); *G08B 29/04* (2013.01); *G08B 29/06* (2013.01); *H04B 17/318* (2015.01)

(58) Field of Classification Search
CPC .............................. H04B 17/23; H04B 17/318
USPC .............................................. 455/67.7, 67.11
See application file for complete search history.

(56) References Cited

U.S. PATENT DOCUMENTS

| | | | | |
|---|---|---|---|---|
| 3,641,496 | A * | 2/1972 | Slavin ..................... | G10L 13/02 704/267 |
| 4,603,325 | A | 7/1986 | Marino et al. | |
| 4,683,459 | A * | 7/1987 | Edson .................... | G08B 23/00 340/514 |
| 5,193,541 | A * | 3/1993 | Hatsuwi .................. | A61B 5/00 128/906 |
| 5,289,531 | A * | 2/1994 | Levine .................... | G04G 11/00 368/10 |
| 6,441,723 | B1 * | 8/2002 | Mansfield, Jr. ........ | G08B 25/06 340/538 |

(Continued)

FOREIGN PATENT DOCUMENTS

| | | |
|---|---|---|
| EP | 1 742 390 A2 | 1/2007 |
| EP | 1 953 720 A2 | 8/2008 |
| EP | 1 988 519 A2 | 11/2008 |

OTHER PUBLICATIONS

Extended European search report for corresponding EP patent application 16155125.4, dated Aug. 8, 2018.

*Primary Examiner* — April G Gonzales
(74) *Attorney, Agent, or Firm* — Husch Blackwell LLP

(57) ABSTRACT

Systems and methods of voice annunciation of signal strength, quality of service, and sensor status for wireless devices are provided. Some methods can include determining a signal strength or range of a radio, determining quality of service events and statistics for a wireless device, or determining a status of a sensor and then verbally annunciating information or instructions relating to the determined signal strength or range, the determined quality of service events and statistics, or the determined sensor status.

12 Claims, 2 Drawing Sheets

(56) References Cited

U.S. PATENT DOCUMENTS

| | | | | |
|---|---|---|---|---|
| 7,006,618 | B1* | 2/2006 | Shaffer | H04M 1/2535 379/202.01 |
| 7,471,956 | B2* | 12/2008 | Byford | H04W 4/02 455/414.2 |
| 7,596,373 | B2* | 9/2009 | McGregor | H04W 24/00 455/418 |
| 8,423,014 | B2* | 4/2013 | McGregor | H04B 17/23 455/418 |
| 9,014,920 | B1* | 4/2015 | Torres | G08B 21/0202 701/45 |
| 2002/0123309 | A1* | 9/2002 | Collier | H04B 17/23 455/67.11 |
| 2003/0047387 | A1* | 3/2003 | Bogat | A47F 9/047 186/59 |
| 2003/0048203 | A1* | 3/2003 | Clary | G01C 23/00 340/945 |
| 2004/0219906 | A1* | 11/2004 | Benco | H04M 3/02 455/415 |
| 2005/0245275 | A1* | 11/2005 | Byford | H04W 4/02 455/456.6 |
| 2008/0055077 | A1 | 3/2008 | Lane et al. | |
| 2010/0056878 | A1* | 3/2010 | Partin | A61B 5/0002 600/301 |
| 2010/0330909 | A1* | 12/2010 | Maddern | H04M 1/6058 455/41.2 |
| 2013/0159437 | A1* | 6/2013 | Itakura | G06F 9/4843 709/206 |
| 2013/0244579 | A1* | 9/2013 | Hohteri | H04W 76/023 455/41.2 |
| 2013/0295853 | A1* | 11/2013 | Keddem | H04B 17/318 455/67.7 |
| 2014/0329471 | A1* | 11/2014 | Bartlett | H04L 43/08 455/67.14 |
| 2015/0327092 | A1* | 11/2015 | Martch | H04W 24/08 455/41.3 |

* cited by examiner

SYSTEM AND METHOD OF VOICE ANNUNCIATION OF SIGNAL STRENGTH, QUALITY OF SERVICE, AND SENSOR STATUS FOR WIRELESS DEVICES

FIELD

The present invention relates generally to wireless devices. More particularly, the present invention relates to a system and method of voice annunciation of signal strength, quality of service, and sensor status for wireless devices.

BACKGROUND

Many wireless devices, including, for example, smoke detectors, carbon dioxide detectors, security devices, and other types of sensors, are known in the art. However, such devices have various limitations.

For example, many wireless devices include a radio with a limited range. The limited range can cause difficulty during installation of a wireless device, especially when the wireless device is installed in an area with marginal reception conditions. For example, when the wireless device is installed in a region with marginal reception conditions, a user may have to revisit the wireless device to remedy an installation issue, thereby incurring additional cost. Range finding techniques are known, but often rely on a blinking LED, beep, or other cryptic annunciation.

Some wireless devices can be networked together in various configurations, such as a hub and spoke or mesh configuration, using a variety network protocols. Network protocols have failure modes, such as packet collision, packet corruption, and the like. However, known wireless devices are limited to simple voice annunciation of such conditions. Indeed, when additional information is available, known systems and methods have only allowed users to access such information via a software application on a smart phone, a website, and the like. Such tools can be cumbersome to use during an installation process.

When the wireless device is installed in any region, sensors therein must often be maintained. However, when the user is inexperienced with wireless devices, sensors, and sensor failure modes, any visit by the user can take longer than necessary. Voice annunciation of maintenance events in wireless devices is known. However, information provided by known systems and methods has not been sufficient for assisting the user attending to the wireless device.

In view of the above limitations and others, there is a continuing, ongoing need for improved systems and methods of installing and maintaining wireless devices.

DETAILED DESCRIPTION

Figure 1:
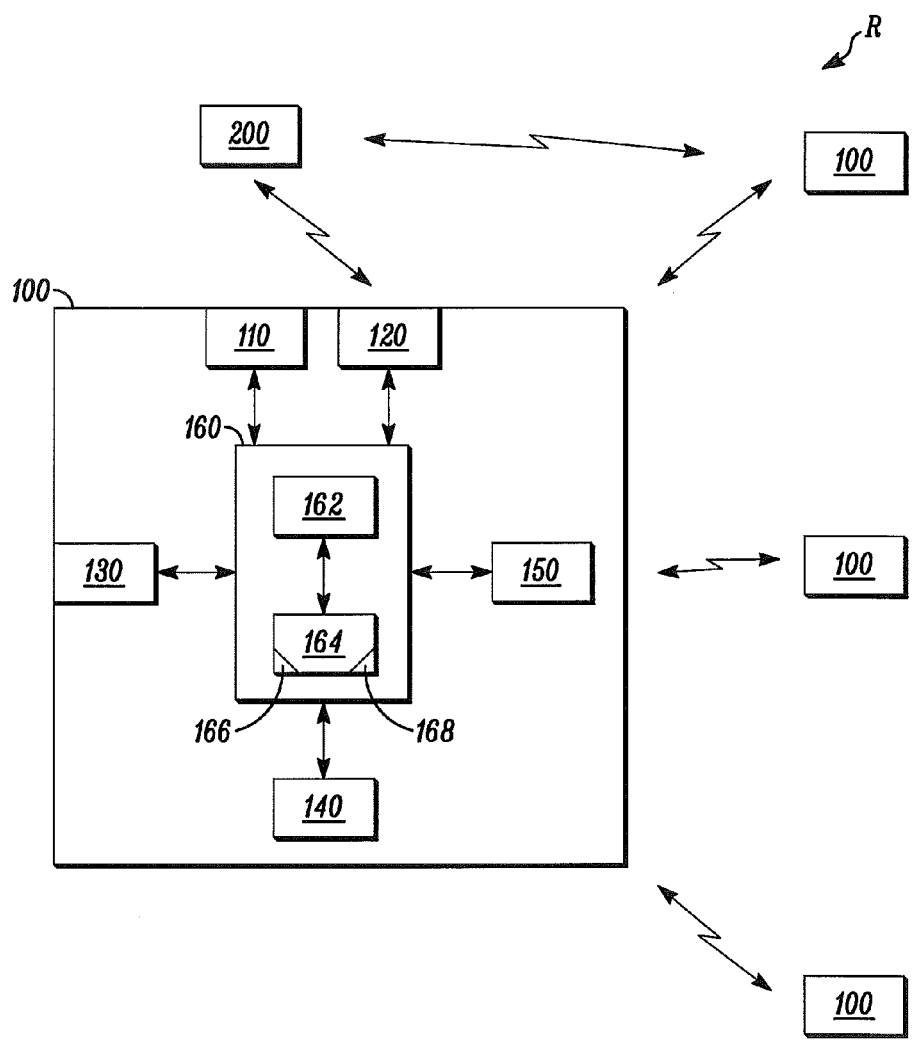
FIG. 1 is a block diagram of a wireless device in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of voice annunciation of signal strength, quality of service, and sensor status for wireless devices. For example, some embodiments can provide a user with information for allowing the user to quickly, intuitively, and decisively determine the quality of service that a wireless device with an integral radio is able to receive and provide, determine and diagnose quality of service issues with the wireless device, and determine a status of a sensor in the wireless device and necessary actions to take in the event of a sensor maintenance event, all without relying on smart phone software applications, blinking LEDs, beeps, or other cryptic annunciations. Indeed, some systems and methods disclosed herein can provide voice annunciation of instructions and guidance to the user during the sensor maintenance event and other detected events and conditions.

In some embodiments, the wireless device can include a voice annunciation module that can execute one or more software applications that include, for example, a quality of service algorithm for detecting and tracking the signal strength of the wireless device's radio or for detecting and tracking quality of service events and statistics, such as dropped packets, interferences, network collisions, and the like.

The wireless device can be placed in an installation mode by actuating a push button or a test switch, providing a voice command, or the like. When in the installation mode, the wireless device can provide a range finding function that can operate intermittently or continuously to determine a range of the wireless device's radio and verbally annunciate information relating to the determined range, thereby allowing hands free operation for the user. For example, in some embodiments, systems and methods disclosed herein can provide real time guidance and instructions to the user regarding the range of the wireless device's radio, such as when the wireless device is almost out of range, verbally annunciating the phrase: "Low signal. Move device closer to central monitoring station."

Additionally or alternatively, when in the installation mode, the wireless device can verbally annunciate information and instructions relating to the detected quality of service events and statistics. In some embodiments, the quality of service events and statistics can be cleared, either individually or as a group, via a further command received from the user, for example, by actuating a button or a switch, providing the voice command, or the like.

In some embodiments, the wireless device can include the voice annunciation module that can execute one or more software applications that include, for example, a sensor monitoring algorithm for detecting failure modes of device sensors. While the wireless device is being serviced, the user can provide input to the wireless device, for example, by actuating the button or the switch, providing the voice command, or the like, to solicit voice annunciation from the wireless device that includes details about the device sensors. The details about the device sensors that can be annunciated by system and methods disclosed herein include, but are not limited to remaining battery life, cleanliness of the sensor, remaining sensor life, and recommendations on actions to take when a sensor threshold level is reached.

In some embodiments, a service company can maintain a group of sensors and can download specific threshold levels to the wireless device. For example, a threshold level can be specific to a type of maintenance event. Additionally or alternatively, service requirements can be determined and set according to a location of the wireless device or an application of the wireless device. For example, the wireless device in a harsh environment can have a lower threshold level for maintenance than the wireless device is a mild environment.

FIG. 1 is a block diagram of a wireless device 100 in accordance with disclosed embodiments. As seen in FIG. 1, the wireless device 100 can include at least an actuator 110, a microphone 120, a radio 130, one or more sensors 140, a battery 150, and a voice annunciation module 160.

The actuator 110 and the microphone 120 can receive input from a user for placing the wireless device 100 in an installation mode, a service mode, a maintenance mode, and the like. For example, the actuator 110 can include a push button or a test switch that can be depressed or toggled by the user. Additionally or alternatively, the microphone 120 can receive a voice command from the user, which can be sent to the voice annunciation module 160 or other control circuitry in the wireless device 100 for processing. In some embodiments, user input can include instructions for handling detected quality of service events and statistics.

The voice annunciation module 160 can include a voice annunciator 162, control circuitry 164, one or more programmable processors 166, and executable control software 168 as would be understood by one of ordinary skill in the art. The executable control software 168 can be stored on a transitory or non-transitory computer readable medium, including, but not limited to local computer memory, RAM, optical storage media, magnetic storage media, flash memory, and the like.

In some embodiments, the executable control software 168 can include software applications or programmed algorithms that can be executed. For example, in some embodiments, the executable control software 168 can execute a software application that includes a quality of service algorithm for detecting and tracking signal strength of the radio 130, for determining a range of the radio 130, or for detecting and tracking quality of service events and statistics for the wireless device 100 as described herein. Additionally or alternatively, in some embodiments, the executable control software 168 can execute a software application that includes a sensor monitoring algorithm for detecting a failure mode of the sensor 140, a remaining life of the battery 150, or details about a state of the sensor 140.

During or after execution of the software applications or the programmed algorithms, the control circuitry 164, the programmable processor 166, or the executable control software 168 can transmit data or instructions to the voice annunciator 162 for annunciation thereof. For example, in some embodiments, a signal sent to the voice annunciator 162 can include guidance regarding the determined range of the radio 130, information related to the detected quality of service events and statistics for the wireless device 100, information related to the sensor 140 or the battery 150, or instructions on actions to take when predetermined sensor events are detected, such as when a sensor threshold level is detected. In some embodiments, the control circuitry 164 can access predetermined phrases that are saved in a local or remote database or storage medium to retrieve a phrase for verbal annunciation thereof according to a condition determined or detected by the wireless device 100.

It is to be understood that, that in some embodiments, the wireless device 100 can communicate with a central monitoring station 200 or with other wireless devices 100 in a region R. For example, the central monitoring station 200 can transmit a signal that can be detected by the radio 130 in the wireless device 100. The control circuitry 164, the programmable processor 166, and the executable control software 168 can use the signal received from the central monitoring station 200 when executing the quality of service algorithm for detecting and tracking the signal strength of the radio 130 and for determining the range of the radio 130. In some embodiments, the central monitoring station 200 can transmit one or more signals to the wireless device 100 for downloading specific information thereto, such as a threshold level for the sensor 140, according to the region R in which the wireless device 100 is located.

Figure 2:
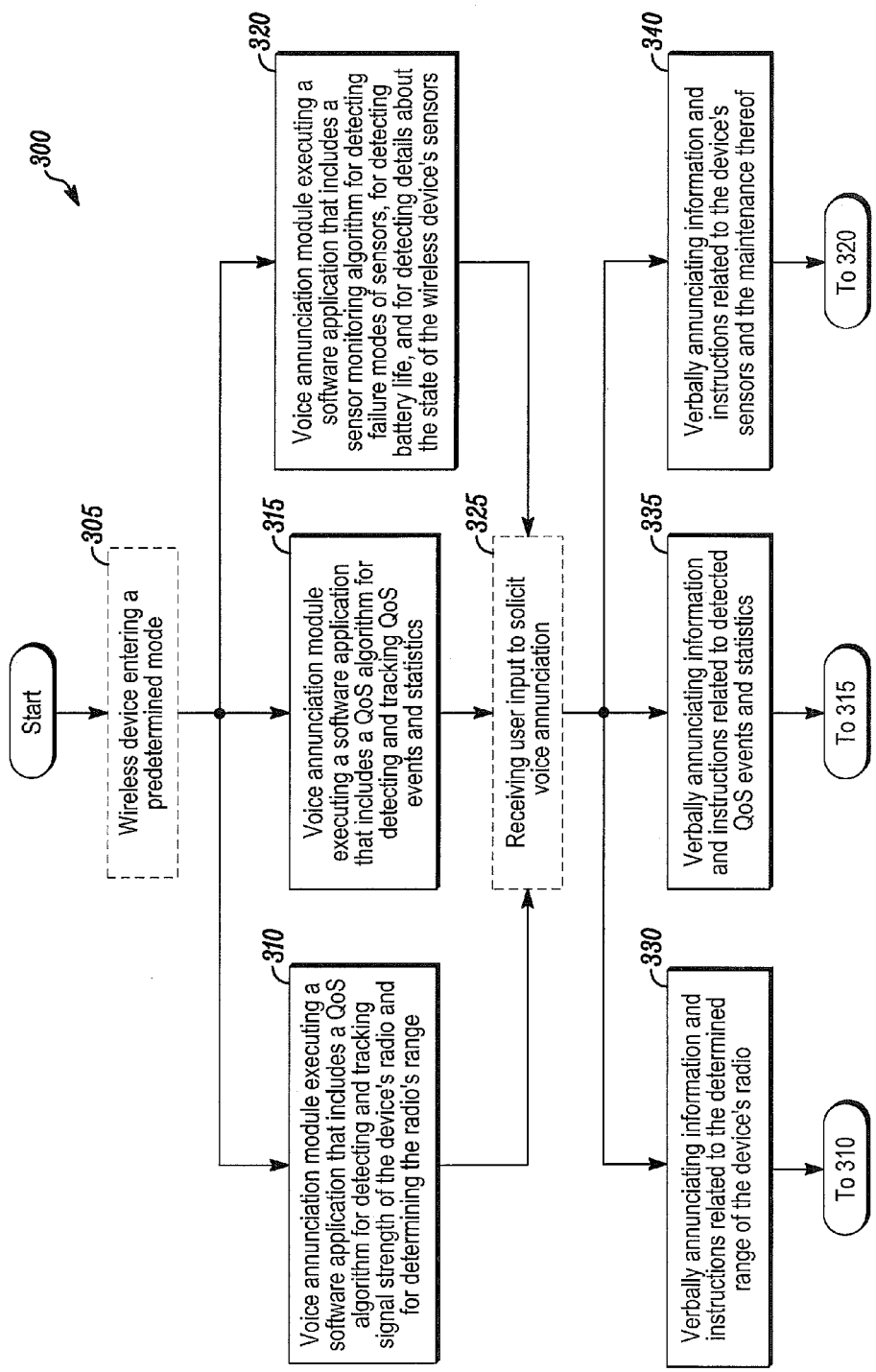
FIG. 2 is a flow diagram of a method in accordance with disclosed embodiments.

FIG. 2 is a flow diagram of a method 300 in accordance with disclosed embodiments. As seen in FIG. 2, the method 300 can include, optionally, a wireless device entering an installation, service, or maintenance mode, for example, responsive to received user input as in 305.

The method 300 can also include a voice annunciation module of the wireless device executing a software application that includes a quality of service algorithm for detecting and tracking signal strength of the wireless device's radio and for determining a range of the radio as in 310, the voice annunciation module of the wireless device executing a software application that includes a quality of service algorithm for detecting and tracking quality of service events and statistics as in 315, and/or the voice annunciation module of the wireless device executing a software application that includes a sensor monitoring algorithm for detecting failure modes of sensors, for detecting battery life, and for detecting details about a state of the wireless device's sensors as in 320. In some embodiments, some or all of the execution as in 310, 315, and 320 can be performed continuously, intermittently, simultaneously, sequentially, individually, automatically, or responsive to a received signal, command, or user input.

As seen in FIG. 2, the method 300 can also include, optionally, the wireless device receiving user input to solicit voice annunciation as in 325. After receiving the user input as in 325 or upon an occurrence or detection of a predetermined event, the method 300 can include the wireless device verbally annunciating information and instructions related to the determined range of the device's radio as in 330, the wireless device verbally annunciating information and instructions related to the detected quality of service events and statistics as in 335, and/or the wireless device verbally annunciating information and instructions related to the device's sensors and maintenance thereof as in 340. In some embodiments, some or all of the verbal annunciation as in 330, 335, and 340 can be performed continuously, intermittently, simultaneously, sequentially, individually, automatically, or responsive to a received signal, command, or user input.

It is to be understood that the method 300 shown in FIG. 2 and others in accordance with disclosed embodiments can be controlled and/or executed by the control circuitry 164 that is part of the voice annunciation module 160 and/or by any other control circuitry in the wireless device 100.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a radio; and
   a voice annunciation module in communication with the radio,
   wherein the voice annunciation module determines a quality of service issue associated with a connection between the radio and the voice annunciation module,
   wherein the voice annunciation module determines an instruction for a maintenance event related to the quality of service issue,
   wherein the voice annunciation module verbally annunciates the quality of service issue,
   wherein the voice annunciation module verbally annunciates the instruction, and
   wherein the quality of service issue comprises dropped packets, interferences, or network collisions.

2. The system of claim 1 further comprising a user input device for receiving user input.

3. The system of claim 1 wherein the voice annunciation module includes a voice annunciator and control circuitry.

4. The system of claim 3 wherein the control circuitry includes a programmable processor and executable control software stored on a non-transitory computer readable medium, and wherein the programmable processor executes the executable control software to determine the quality of service issue or to verbally annunciate the quality of service issue.

5. The system of claim 1 further comprising a storage device for storing a plurality of predetermined phrases, wherein the voice annunciation module retrieves at least one of the plurality of predetermined phrases from the storage device for verbal annunciation thereof, and wherein the at least one of the plurality of predetermined phrases is determined based on the quality of service issue.

6. A method comprising:
   determining a quality of service issue of a wireless device;
   determining an instruction for a maintenance event related to the quality of service issue of the wireless device;
   verbally annunciating the quality of services issue of the wireless device; and
   verbally annunciating the instruction,
   wherein the quality of service issues comprises dropped packets, interferences, or network collisions.

7. The method of claim 6 wherein determining the quality of service issue includes identifying at least one of a plurality of predetermined phrases based on the quality of service issue and retrieving the at least one of the plurality of predetermined phrases from a storage device.

8. The method of claim 6 further comprising entering a predetermined mode prior to determining the quality of service issue.

9. The method of claim 8 further comprising entering the predetermined mode responsive to a user input.

10. The method of claim 6 further comprising determining the quality of service issue responsive to a user input.

11. The method of claim 6 further comprising verbally annunciating the quality of service issue responsive to a user input.

12. The method of claim 6 further comprising verbally annunciating the quality of service issue responsive to detecting an occurrence of a predetermined event.

* * * * *